April 19, 1955     B. L. HAVENS     2,706,341
LIST INDICATOR

Filed Nov. 23, 1945     2 Sheets-Sheet 1

INVENTOR
BYRON L. HAVENS

BY     ATTORNEY

April 19, 1955  B. L. HAVENS  2,706,341
LIST INDICATOR
Filed Nov. 23, 1945  2 Sheets-Sheet 2
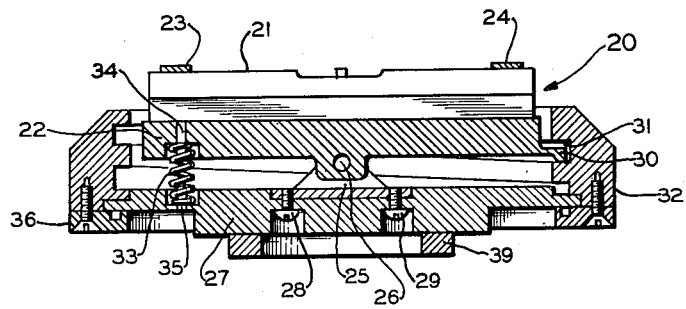
FIG. 4
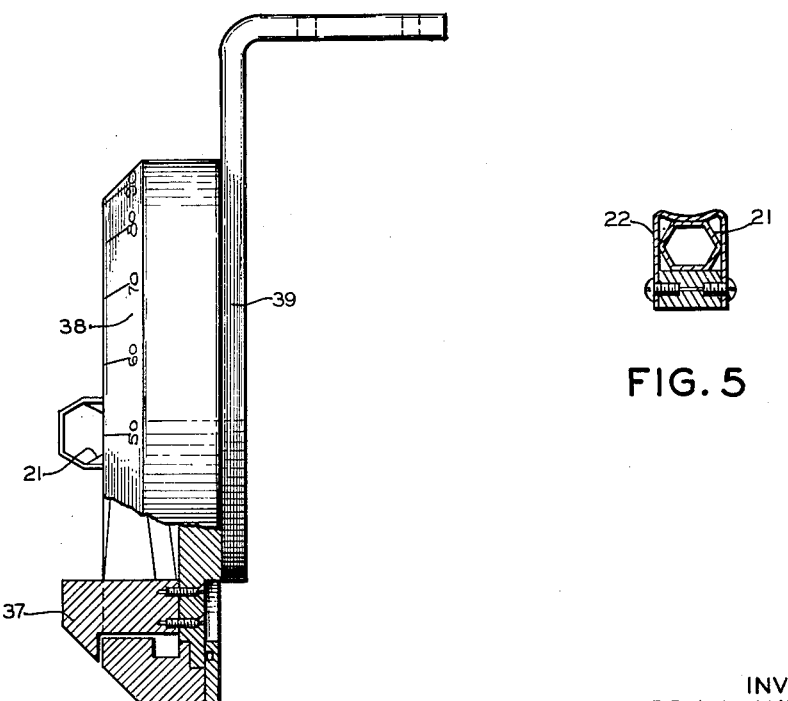
FIG. 5
FIG. 3
INVENTOR
BYRON L. HAVENS
BY
ATTORNEY

United States Patent Office 2,706,341
Patented Apr. 19, 1955

2,706,341

LIST INDICATOR

Byron L. Havens, Cambridge, Mass., assignor, by mesne assignments, to the United States of America as represented by the Secretary of the Navy Application November 23, 1945, Serial No. 630,359

3 Claims. (Cl. 33—214)

This invention relates to an instrument for use in connection with radar bombing from aircraft and more particularly to such an instrument for accurately indicating the list of such aircraft in order to reduce bombing errors resulting from improper levelling of the aircraft.

Standard aircraft instruments which are capable of indicating the tilt of an aircraft such as the "artificial horizon" ordinarily cannot be read with an accuracy greater than about three degrees. As a result, during conditions of limited visibility, when the pilot is unable to see the natural horizon, the aircraft may fly with an unintentional list. A target to be bombed therefore appears on the radar scope as lying along the ground track of the aircraft when it actually lies on a line parallel to the ground track, but displaced by a distance $h \tan \theta$, where $h$ is the altitude of the aircraft, and $\theta$ is the list angle. It will readily be understood therefore, that sizeable bombing errors may result if the list angle is not controlled. This invention, in addition to reducing the bombing errors occurring from flying with an unintentional list, provides the instrumentation for cross-trail correction procedure in which the aircraft is flown with a deliberate list as hereinafter described.

An object of this invention is to provide an instrument for accurately indicating the list of an aircraft in order to reduce the bombing errors normally introduced due to improper leveling of the aircraft.

Another object of this invention is to provide a list indicator in order that the list of an aircraft may be accurately controlled.

A further object of this invention is to provide an instrument for accurately indicating the list of an aircraft in order that the aircraft may be flown with a predetermined degree of list.

A more particular object of this invention is to provide a list indicator for bombing aircraft in order that the aircraft may be flown with a deliberate list to correct errors due to the cross trail of the bombs being dropped.

Further objects and advantages of this invention as well as its construction, arrangement, and operation, will be apparent from the following description and claims in connection with the accompanying drawings, in which:

Fig. 3 is a side view partially in section of Fig. 1;

Fig. 4 is a sectional view taken along the line IV—IV of Fig. 1; and

Fig. 5 is a sectional view taken along the line V—V of Fig. 1.

Figure 1:
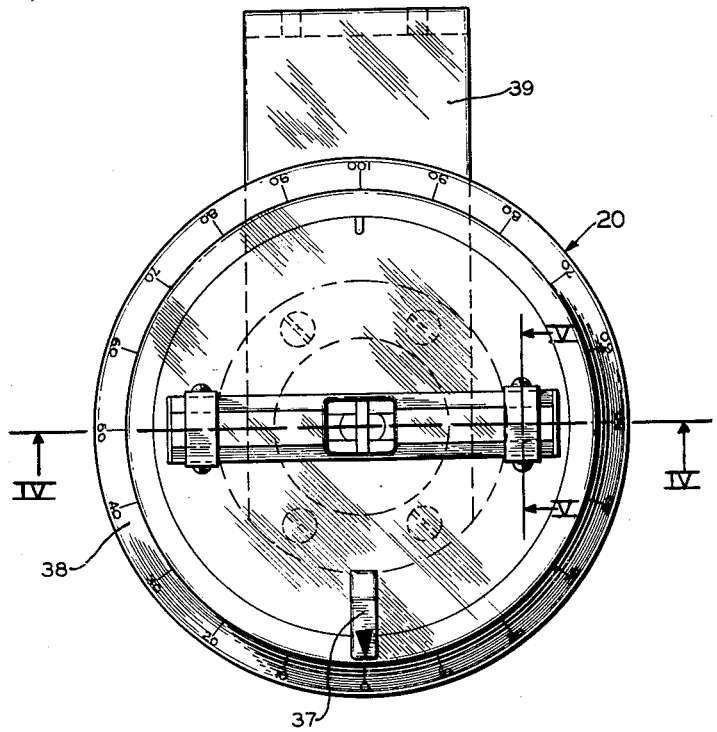
Fig. 1 is a plan view of the indicator as contemplated by this invention.
Figure 2:
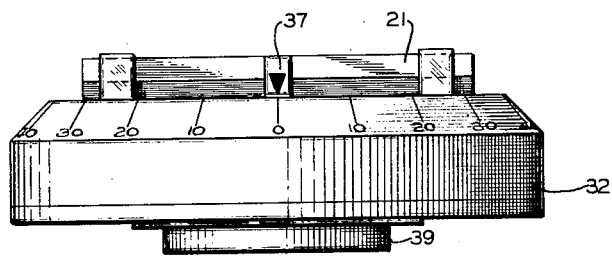
Fig. 2 is a front view of the indicator as shown in Fig. 1.

Referring to the drawings there is shown a tilt indicator 20 constructed according to the principles of this invention consisting of a spirit level 21 mounted on a carriage 22 by means of a pair of suitable clamps 23 and 24. Carriage 22 is pivotally mounted on a pivot 25 by means of a pivot shaft 26, pivot 25 being secured to a base member 27 by means of a pair of screws 28 and 29. An extension 30 on carriage 22 cooperates with a square thread track 31 cut on the internal surface of a housing 32 which is rotatably mounted on base 27. The end of carriage 22 opposite from extension 30 is free to move in a vertical direction except for a small amount of restraint supplied by a spring 33 which urges extension 30 into slidable contact with the base of square thread track 31 in order to provide a balancing contact with track 28 at all times. Spring 33 is retained in position by means of a pair of retaining pins 34 and 35, mounted on carriage 22 and base 27 respectively. Housing 32 is rotatably mounted on base 27 and held in slidable contact therewith by means of a retaining ring 36. A pointer 37 fastened to base 27 cooperates with a calibrated dial 38 on a beveled edge of housing 32 to indicate the tilt of the craft on which the instrument is mounted. A bracket 39 attached to base 27 is used to fasten the instrument to the aircraft in view of the pilot. When housing 32 is rotated, the square thread forces the carriage to tilt, and the bubble in the spirit level is displaced from the center of the level. In order to bring the bubble back to center, the instrument mount (aircraft) must be tilted in a compensating direction. Due to the low pitch of the square thread, the amount of tilt of the spirit level can be accurately set within a few mils of the desired value.

Cross-trail correction of bombing errors may be accomplished by use of this indicator in the following manner. If a bombing aircraft is flying in air which has a component of ground velocity normal to the ground track of the aircraft, a bomb released from such an aircraft will land on the down-wind side of the ground track. The locus of the impact points which would result from a plane releasing bombs while flying along a given ground track has been defined as the impact track. The distance (perpendicular to the aircraft heading) between the ground track and the impact track is referred to as the cross-trail. This cross-trail distance is approximately equal to the product of the linear trail and the tangent of the drift angle where the linear trail is the horizontal distance by which the bomb lags the aircraft at the distant of impact, and the drift angle is the horizontal angle between the aircraft heading and its ground track.

In the case of most radar bombsights a "perfect" bomb run will cause the ground track of the plane to pass through the target, but the bomb will strike on the impact track and miss the target accordingly. This error may be eliminated by tilting the axis of the radar antenna in a vertical plane perpendicular to the ground track so that the tilt angle is just equal to the inverse tangent of the quotient of the previously defined cross-trail distance and the altitude. If this latter condition is satisfied, the impact track (instead of the ground track) will pass through the target when a perfect bomb run is made.

In cases where it is not feasible to tilt the radar antenna, a similar result may be affected by flying the airplane with a "list" sufficient to tilt the axis of the antenna through the same angle.

In use, the appropriate setting of the calibrated scale for a particular bomb run is furnished to the pilot by the navigator who determines it with the aid of a nomogram or similar computer which gives the necessary roll angle as a function of the trail angle of the bomb and the drift of the airplane. Generally, the drift angle and trail angle are based on the velocity of the wind at the bombing altitude, although, if desired, the corresponding quantities based on "ballistic wind" may be used instead. The ballistic wind is a fictitious wind, uniform at all altitudes, which would have the same total effect on the bomb as the various actual winds encountered by it during its fall.

After making the correct setting on the tilt indicator herein disclosed and described, the pilot trims the automatic flight control equipment of the aircraft until the bubble of the tilt indicator is centered. When these conditions are satisfied, the aircraft will fly with a correct list to eliminate the error due to the cross trail of the bomb.

Although a particular embodiment of this invention has been disclosed and described it is to be understood that various changes and modifications may be made therein without departing from the spirit and scope thereof as set forth in the appended claims.

What is claimed is:

1. Apparatus for indicating the amount of tilt of an aircraft comprising, a base member adapted to be attached to an aircraft, a carriage pivotally mounted on said base member, a spirit level fixedly secured to said carriage, a housing surrounding said base member and rotatable relative thereto, means on said base member cooperating with said housing to prevent axial movement of said housing relative to said base member, a spiral thread track on the internal wall of said housing, an extension on said carriage having means slidably cooperating with said track to tilt said spirit level in response to rotation of said housing, complementing pointer means and calibrated dial means, one of said means being associated with the external surface of said housing, the other of said means being associated with said base member, said pointer means and said dial means cooperating to indicate the amount of tilt of said spirit level.

2. Apparatus as defined by claim 1 wherein said dial means is secured to said housing and said pointer means is secured to said base member.

3. In the apparatus of claim 1, means cooperating with said carriage and said base member urging said extension against said spiral track.

References Cited in the file of this patent

UNITED STATES PATENTS

| 56,013 | Cooper | July 3, 1866 |

FOREIGN PATENTS

| 17,189 | Great Britain | of 1908 |
| 827,831 | France | Feb. 2, 1938 |